Feb. 20, 1968   J. B. GUIN   3,369,796
AIRCRAFT IN-FLIGHT CARGO LOADERS
Filed May 3, 1965   2 Sheets-Sheet 1
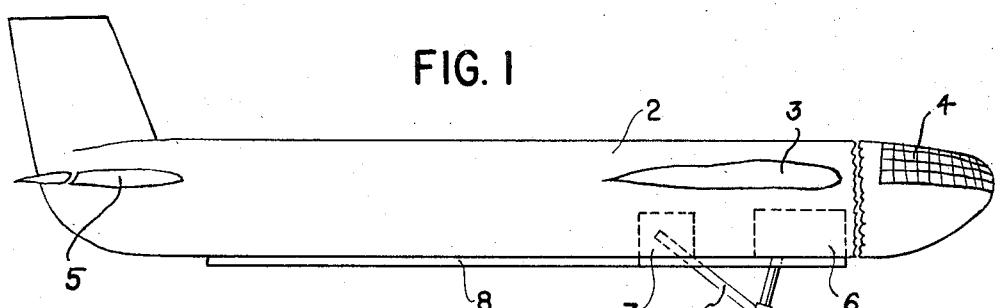
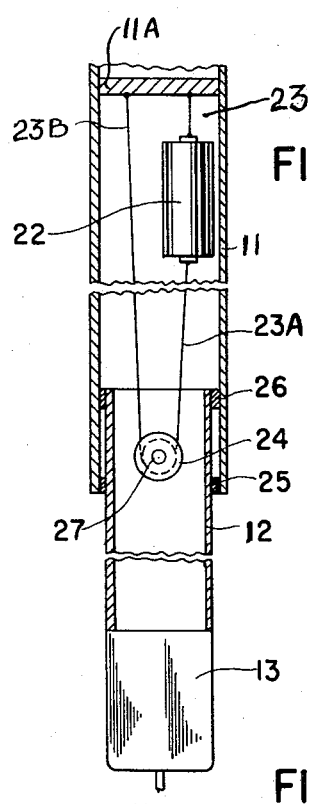
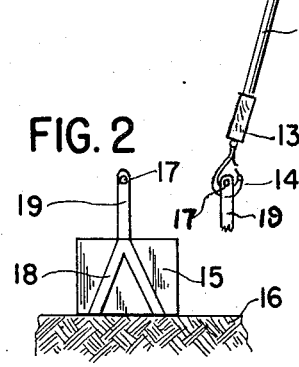
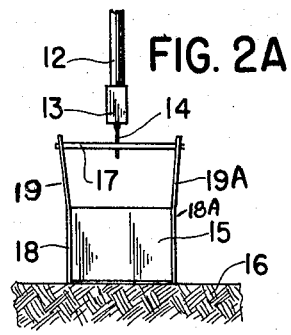
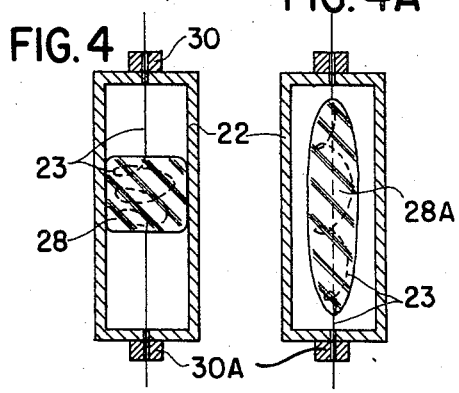
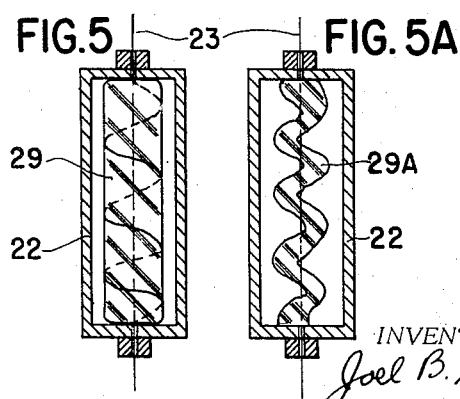
INVENTOR.
Joel B. Guin Feb. 20, 1968   J. B. GUIN   3,369,796
AIRCRAFT IN-FLIGHT CARGO LOADERS
Filed May 3, 1965   2 Sheets-Sheet 2
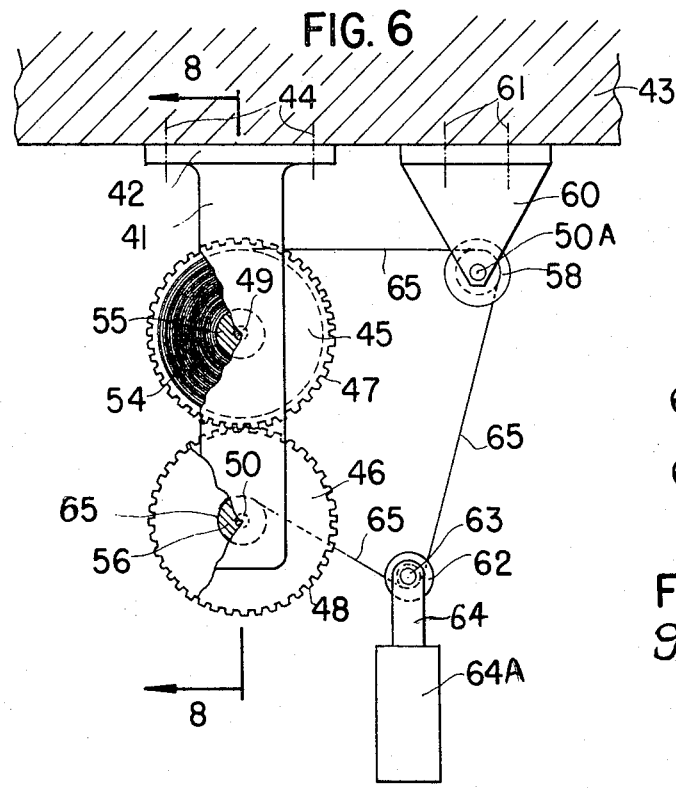
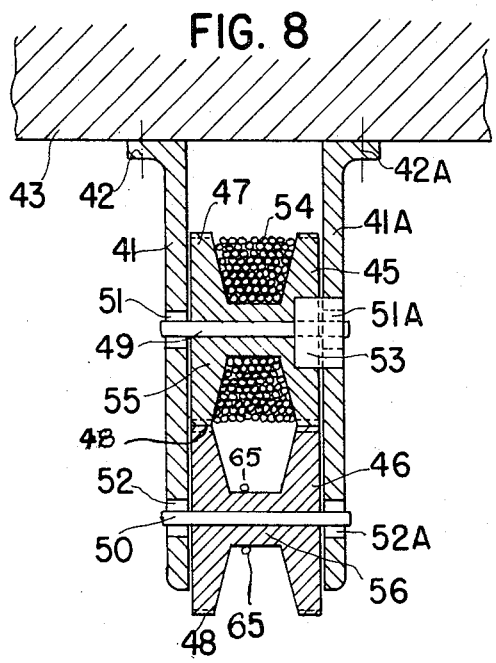
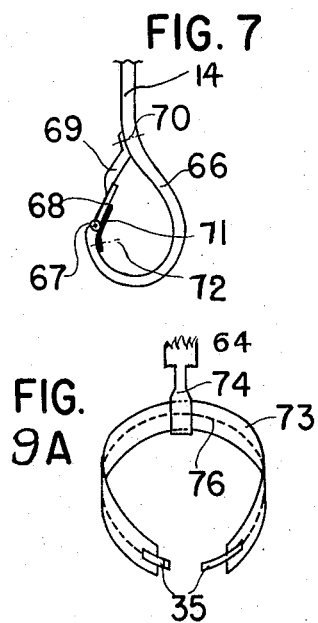
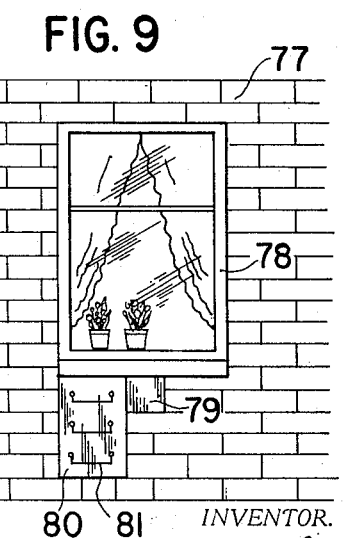
INVENTOR.
Joel B. Guin

United States Patent Office 3,369,796
Patented Feb. 20, 1968

3,369,796
AIRCRAFT IN-FLIGHT CARGO LOADERS
Joel B. Guin, 148 E. 48th St.,
New York, N.Y. 10017
Filed May 3, 1965, Ser. No. 452,637
3 Claims. (Cl. 258—1.2)

This invention relates to an aircraft in-flight loader for picking up cargo of moderate size or properly trained personnel at moderate flying speed by means of: An extensible and retractable telescoping beam that swings down, hooks onto the object or person, swings back and up at the moment of contact to reduce shock, and then is raised close to or into the fuselage for unloading; and special shock-absorbing apparatus in the beam and/or between the beam and the hook. Most attempts to accomplish this have involved cumbersome devices such as an elastic rope tied to the object to be picked up and stretched between two tall poles that allow the rope to be picked up by an over-flying plane, or a balloon to carry the rope aloft to a height at which it can be caught and tied by a forked device on the front end of a plane. Such methods and equipment involve so much preparation on the ground that personnel trapped even miles from an enemy could be doomed, and wounded personnel could not begin to accomplish it. The ground equipment is of course forsaken.

The objects of this invention are: To make it possible for an airplane at moderate speed to pick up personnel from ground or water with only a few straps to form a body-harness attached to a loop or hoop that is caught by the hook from the plane; to pick up personnel so quickly that an enemy only a few hundred yards away could not prevent rescue; to operate so gently that in an emergency even wounded, sick or injured personnel could be picked up; to pick up mail, small parcels, emergency cargo, etc. from any place where war, isolation, floods, disasters, emergencies, interrupted transportation, etc., make this service worthwhile; to provide the pick-up half of an air pick-up and delivery service for areas that generate too little air traffic to justify facilities for landing planes or even landing a plane.

Other objects and advantages of the invention will be apparent when the detailed description is read with reference to the accompanying drawings in which:

FIG. 1 shows schematically an aircraft with lowered beam;

FIG. 2 is a side view of cargo with a version of pick-up bar and supports;

FIG. 2A is a view of the cargo from in front with the beam and hook approaching the pick-up bar;

FIG. 3 is a cross-section showing a shock-absorbing apparatus attached to operate between two sections of the beam;

FIG. 4 is an enlarged cross-sectional view of the shock-absorbing device of FIG. 3 in normal position;

FIG. 4A shows the shock-absorbing device of FIG. 4 in stretched position;

FIG. 5 is an enlarged cross-sectional view of another kind of shock-arsorbing device in normal position;

FIG. 5A shows the same shock-absorbing device in stretched position;

FIG. 6 shows a different shock-absorbing apparatus based on two cog-wheels that interlock so that the shaft of one winds up wire (or rope) as the other pays it out;

FIG. 7 is an enlarged view of a hook for use with the apparatus in FIG. 1 or 6;

FIG. 8 is a cross-section taken along line 8—8 of FIG. 6;

FIG. 9 is a view of a suggested additional application of the shock-absorbing device shown in FIG. 6, that of an emergency fire-escape from burning planes, buildings, etc.;

FIG. 9A shows a chest strap for use in connection with the fire-escape application in FIG. 9.

FIG. 1 shows airplane 2 with telescoping beam 11 in process of picking up cargo attached to inverted Y bar 19 by means of cargo hook 14. The beam is attached to a motor means 6 which furnishes th e power to extend and retract it. The angle of the beam is raised or lowered by extensible and retractable plunger arm 9 which ends in a sliding means such as collar 10 through which beam 11 glides freely as it swings in an arc in the vertical plane. Sliding collar 10 is movably attached to variable speed power unit 7 which extends or retracts plunger arm 9 to lower or raise beam 11. Beam 11 is movably attached to motor means 6 which can be extended or retracted either before or after it is swung up or down by the action of plunger arm 9. Power unit 7 and motor means 6 may be activated by hydraulic, pneumatic or electrical means. Lower beam section 12 is inclosed by and protrudes from beam 11, and on its lower end may have a shock-absorbing unit 13 to which an object holder such as hook 14 is attached. If the shock-absorbing unit is omitted, hook 14 may be attached directly to lower beam section 12. As shown, hook 14 is in process of catching horizontal bar 17 of a cargo loading apparatus whose inverted Y bar holds the ends of the horizontal bar.

FIG. 2 shows a side-view of cargo 15 inclosed within inverted Y-bars 18 and 18A (not shown) whose vertical parts 19 and 19A (not shown) are connected by and attached to horizontal bar 17 which is made of strong elastic material to absorb any residual shock when the hook hits it. Cargo and bars rest on the ground 16.

FIG. 2A is a front view of cargo 15 with the two inverted-Y bars attached to horizontal bar 17 which is about to be jerked into the air by hook 14 attached to shock-absorbing unit 13.

FIG. 3 shows a cross-section of the junction between beam 11 and lower beam section 12 with secondary shock-absorbing unit 22 operating between them. It is attached to wire 23 which is fastened at one end to connecting bar 11A between the sides of beam 11. Wire (or rope) 23A extends from the lower end of unit 22, loops around wheel 24 whose shaft 27 is attached to both front and rear walls of beam section 12. Since the top of lower beam section 12 is placed just far enough above the bottom of beam 11 to draw nylon or woven wire ropes 23A and 23B taut without stretching the shock unit, when hook 14 (FIGS. 1 and 7) hits the cargo beam section 12 is drawn farther down, stretching shock unit 22, both actions serving to absorb the shock. This stretching is checked by the number of turns of wire within unit 22 (see FIGS. 4 to 5A) and security rings 26 which are attached to the top of lower beam section 12 and cannot go beyond security rings 25 attached to the bottom of beam 11. Main shock unit 13 is at the end of section 12.

FIGS. 4 to 5A illustrate two of many possible versions of shock unit 22 in FIG. 3. FIG. 4 shows an unstretched mass of resilient material such as rubber or plastic around which and within which are coiled many turns of nylon or woven wire rope 23, and FIG. 4A shows the resilient material 28A stretched part way with much of the rope having been paid out through the lower end of the shock unit. Friction units 30 and 30A at top and bottom respectively prevent jerks from kinking the rope and also add to the shock absorbing ability of the units.

FIG. 5 shows resilient material 29 unstretched with many turns of rope 23 wound around and within its full length, and FIG. 5A shows the resilient material distorted and twisted around rope 23 which is pulled taut. Significantly, in FIG. 5 the material is straight and the rope is coiled: in FIG. 5A the two reverse conditions, the material being coiled, the rope being straight. Distance stretched, tension and elasticity depend upon the hardness and elasticity of the materials chosen, the method of making and materials in the rope, and the number of turns of the rope.

An enlargement of the device contained in shock absorbing unit 13 in FIG. 1 is shown in FIG. 6. Mounting frame 43, attached to the inside top of unit 13, has mounted upon its lower side beams 41 and 41A by conventional means such as bolts 44 running through beam ends 42 and 42A, and metal base 60 by means such as bolts 61. Between beams 41 and 41A are cog wheels 45 and 46, each having an H-shaped cross section as in FIG. 8, with interlocking cogs 47 and 48 respectively. Wheels 45 and 46 rotate on shafts 49 and 50 respectively, whose ends penetrate beams 41 and 41A. Auxiliary wheel 58 rotates on shaft 50A supported by base 60. Cable windings 54 on core 55 mounted on shaft 49 fill the space within the H of wheel 45, one cable means 65 extending to and around grooved wheel 62 which it supports, then to and around core 56 mounted on shaft 50. Wheel 62 rolls on shaft 63 from which hangs attaching member 64. A hook 14 (FIG. 7) can be mounted directly upon member 64 or to an intervening means such as 64A.

In FIG. 7 is shown an enlarged view of hook 14 of FIGS. 1 and 2A. Loop 66 has a tongue 68 movably attached to its tip by pin 67, and a counter-stop 69 against which tongue 68 is held by a spring 71 attached to loop 66 by screw 72.

FIG. 8 is a vertical section along line 8—8 of FIG. 6, showing cog wheels 45 and 46 respectively interlocked through their cogs 47 and 48, and rotating on shafts 49 and 50 respectively. Shaft 49 has left and right bearings 51 and 51A respectively and shaft 50 has left and right bearings 52 and 52A respectively. The bearings of both shafts 49 and 50 are held within and attached to left and right fastening beams 41 and 41A respectively which are attached to support frame 43 by bolts 42 and 42A respectively. Windings 54 around core 55 of wheel 45 completely fill the H-space of the cross-section but the single cable means wound around core 56 of wheel 46 is starting the turns that will quickly reduce the circumference of the former and increase that of the latter. When the two sets of windings become equal in circumference, the rates of winding and unwinding will be exactly equal: this serves the dual purpose of absorbing shocks and braking the pay-out of cable means.

Here is the secret of this shock-absorbing system: as drawn there is one turn of cable means 65 on core 56 of wheel 46, but the H-space in wheel 45 is filled with windings 54 around core 55; since the cogs force both wheels to rotate at the same rate but in opposite directions, each turn of wheel 45 pays out much more cable means than will be taken up simultaneously by wheel 46, the remainder going to permitting object 64A to sink rapidly, but at a decreasing rate as the windings about core 56 get thicker. Mid-way, when the windings are equal in circumference, the same amount of cable means is wound up as is paid out, and the object can go no lower. When used for loading planes the beam and its burden would be pulled into the plane at this point. In such applications the last half of the windings on the upper wheel could be replaced with a larger core, as the cable means is never unwound. If it is desired to draw object 64A back up a motor means could be applied to the upper wheel to rewind the cable means: in this case the object would rise at an increasing rate, a constant-speed mtor bringing it to the top with a jerk.

FIG. 9 shows a fire-escape application of the shock-absorbing device in FIGS. 6 and 8 which could be placed in container 80 below window 78 of building 77, an institutional or hotel building with inadequate fire-escape facilities. An accessory strap or rope and a safety belt such as 73 in FIG. 9A can be stowed in container 79. The safety belt, attached to member 64 by the strap, is placed around the user's chest, who may then climb or be assisted over rungs 81 till his descent takes up the slack in the strap, then descend to the ground at a speed that rapidly decreases as he approaches the ground. The length of the descent is determined by the length of windings 54, and the speed of the descent by the relative diameters of cores 55 and 56 with the windings thereon. (See FIG. 8.)

FIG. 9A shows one version of a life-saving belt 73 joined by connecting means 74 to member 64. Belt 73 is strengthened by a metal or strong non-metallic supporting spring to reinforce it and to prevent it from binding old or infirm persons too tightly, as a rope might. An adjustable buckle or snap fastener 35 holds the belt taut around the chest.

To recapitulate, all the following contribute to absorbing the shock of picking up cargo or personnel: the secondary shock-absorbing unit, the ropes attaching it to a beam section, the rope from the unit around the wheel attached to the next lower beam section and the lowering of this beam section when the hook hits the cargo apparatus; the actions of the wheels of the main shock-absorbing unit and the elasticity of the cable means involved; and, most important of all, the rapid swinging backward of the entire beam with the cargo below that the moment of contact, it being possible to momentarily counteract much if not all of the shock due to forward motion of the plane.

I claim:
1. An aircraft in-flight lader for picking up objects from limited surface areas while flying low at moderates speeds, comprising in combination:

motor means mounted within the aircraft fuselage forward of the center of gravity of the aircraft;

a beam made of several telescoping sections, movably attached to and extended and retracted by said motor means from which it projects backward along the fuselage when not in use;

a sliding collar movably disposed around said beam and integrally connected to a plunger arm whose other end is movably attached to a variable speed power unit which extends and retracts the plunger arm in the process of swinging said beam downward and upward respectively;

an attaching member mounted upon the lower end of the bottom section of said beam;

an object holder mounted upon said attaching member to pick up objects suitably disposed on the surface; and shock absorbing means selectively located and mounted on the sections of said beam to reduce inertial shock when picking up objects from the surface.

2. An aircraft inflight loader according to claim 1 wherein said shock absorbing means includes a primary unit comprising:

a mounting frame fastened to the end of said bottom section of the beam;

two metal supports attached to the lower side of said mounting frame, each support penetrated by two holes, the top holes and bottom holes respectively being at equal distances from said mounting frame;

two wheel shafts, one extending between and supported by said top holes, the other extending between and supported by said bottom holes, each shaft supporting rotatably a cog wheel having an H cross-section with the cogs disposed around the periphery of each leg of the H and interlocking with the cogs similarly disposed around the periphery of each leg of the H of the other wheel, the wheels thus being rotatable in opposite directions;

a mounting base fastened to said mounting frame near said metal supports and having two legs, each penetrated by a hole which supports one end of a shaft on which an auxiliary wheel is rotatably mounted;

a cargo wheel having around its periphery a groove for a cable means, upon which it is movably supported, the wheel being penetrated by a shaft from the ends of which hang means for mounting said attaching member; and cable means fastened to and wound around the upper of said cog wheels in multiple turns that fill the H-shaped space within the upper cog wheel, the cable means then passing over the auxiliary wheel, thence around the peripheral groove of the cargo wheel, then around the lower of said cog wheels to which it is secured;

the thickness and proportionate number of windings of said cable means on the cog wheels being such that when an object is picked up and its weight hangs from said cargo wheel the cable means starts at once to stretch and also to pay out the excess of footage unwound by the upper cog wheel over the footage wound up by the lower cog wheel which has less overall diameter at first, this pay out decreasing at an increasing rate as the diameter of the lower wheel and its windings approaches the diameter of the upper wheel with its windings, this pay out being a shock absorbing means which comes to an end when said diameters of upper and lower cog wheels are equal.

3. An aircraft in-flight loader according to claim 1 wherein said shock absorbing means includes a secondary unit comprising:

mounting means attached to the sides of one of the sections of said beam;

cable means attached to the bottom of the connecting bar at two places spaced apart, from which the cable means is suspended so as to form a U-shaped loop;

a cylindrical containing means disposed around one arm of said U-loop and having holes through the top and bottom through which said cable means can pass freely;

a mass of shaped resilient material mounted within said containing means, and having selective footage of said cable means disposed around it in multiple turns under little tension when said beam is not supporting an object to be picked up;

a grooved wheel mounted upon and movably supported by said cable means which fits in the groove, the wheel always resting at the lowest point of said U-loop and rotating around a shaft which it supports and which is attached at each end to opposite walls of the beam section next below that to which said connecting bar is attached, which section next below is thereby movably supported so as to rise or fall according to the weight of the object being picked up and the inertia thereof, in relation to the resistance and resilience of said resilient material; and a security ring attached to the inside of said beam section that supports the connecting bar, near the bottom thereof, disposed so as to impinge upon another ring attached to the outside near the top of said next lower beam section and thus prevent the latter, with the other component parts mounted thereupon, from slipping or sliding off the former.

References Cited

UNITED STATES PATENTS

| | | | |
|---|---|---|---|
| 97,487 | 12/1869 | Dyatt | 254—184 |
| 377,559 | 2/1888 | Hitchcock | 24—233 |
| 2,195,299 | 3/1940 | Frankel | 182—3 |
| 2,917,289 | 12/1959 | Muramatsu | 258—1.2 |

ROBERT B. REEVES, *Primary Examiner.*

F. R. HANDREN, *Assistant Examiner.*